US011862015B2

(12) United States Patent
Goeders

(10) Patent No.: US 11,862,015 B2
(45) Date of Patent: Jan. 2, 2024

(54) CORNER MOUNT WARNING SYSTEM

(71) Applicant: Jon Jay Goeders, Kirkwood, MO (US)

(72) Inventor: Jon Jay Goeders, Kirkwood, MO (US)

( * ) Notice: Subject to any disclaimer, the term of this patent is extended or adjusted under 35 U.S.C. 154(b) by 0 days.

(21) Appl. No.: 17/683,961

(22) Filed: Mar. 1, 2022

(65) Prior Publication Data

US 2022/0189298 A1 Jun. 16, 2022

Related U.S. Application Data

(63) Continuation-in-part of application No. 16/223,566, filed on Dec. 18, 2018, now abandoned.

(51) Int. Cl.
*G08G 1/07* (2006.01)
*G08G 1/056* (2006.01)

(52) U.S. Cl.
CPC ............... *G08G 1/07* (2013.01); *G08G 1/056* (2013.01)

(58) Field of Classification Search
CPC ........ G08G 1/07; G08G 1/056; G09F 27/005; G09F 2019/225; G09F 13/0436; G09F 2013/05; G09F 19/22
USPC ........................................................ 248/220.1
See application file for complete search history.

(56) References Cited

U.S. PATENT DOCUMENTS 4,577,437 A * 3/1986 Gionet .................... E05F 15/73 49/25
4,903,010 A * 2/1990 Greene .................. G08B 13/08 340/693.11
4,928,101 A * 5/1990 Favors ................... G08G 1/164 367/909
6,044,601 A * 4/2000 Chmela ................. E04F 19/028 52/287.1
10,242,561 B1 * 3/2019 Davies ................. G08B 29/185
11,551,533 B1 * 1/2023 Bower ..................... G08B 7/06
2008/0094249 A1 * 4/2008 Pappas ................... G08G 1/087 340/906
2011/0042542 A1 * 2/2011 Russo ...................... A47G 1/17 248/467
2017/0162047 A1 * 6/2017 Garcia Lopez .......... G08G 1/16
2020/0191327 A1 * 6/2020 Goeders ................. G08B 21/22

* cited by examiner

*Primary Examiner* — Muhammad Ijaz
(74) *Attorney, Agent, or Firm* — ZarleyConley PLC

(57) ABSTRACT

A corner mount warning system includes a housing adapted to receive and engage a corner of two perpendicular walls. The housing has a top wall, a bottom wall, an inner side wall, an outer side wall, a first end wall, and a second end wall. Each end wall has a motion detector and at least one warning device. The motion detectors and the at least one warning device are connected to and operated by a control system.

2 Claims, 5 Drawing Sheets

CORNER MOUNT WARNING SYSTEM

CROSS REFERENCE TO RELATED APPLICATION

This application is a continuation-in-part of U.S. application Ser. No. 16/223,566 filed Dec. 18, 2018, the contents of these applications are hereby incorporated by reference in their entirety.

BACKGROUND OF THE INVENTION

The present invention is directed to a corner mount warning system. More particularly the invention is directed to a system that detects and warns of oncoming traffic from around a corner.

High traffic areas such as hallways in schools, hospitals, offices, hotels, senior care facilities, warehouses, big box stores and the like present potential hazard areas. In particular, at corners, where two perpendicular walls meet, there is a potential for a collision between individuals and/or objects. When individuals alone, or individuals with objects such as equipment carts, wheelchairs, and the like simultaneously reach a corner, where view of oncoming traffic is obscured, there is the potential for a collision, injury, and/or damage to equipment. Accordingly, a need exists in the art for a system that addresses these problems.

An objective of the present invention is to provide a corner warning system to prevent or reduce accidents.

Another objective of the present invention is to provide a corner warning system that is small, lightweight, and low-cost.

A still further objective of the present invention is to provide a corner warning system that improves the efficiency of movement in a busy, fast-paced environment.

These and other objectives will be apparent to those having ordinary skill in the art based upon the following written description, drawings, and claims.

SUMMARY OF THE INVENTION

A corner mount warning system includes a housing that is adapted to fit about a corner of two perpendicular walls. The housing has a top wall, a bottom wall, an inner side wall, an outer side wall, a first end wall, and a second end wall. Preferably, the inner side wall engages the two walls for its entire length or alternatively engages a mounting plate. The first and second end walls dwell in planes that are perpendicular to one another.

Each end wall has at least one motion detector and at least one warning device. The motion detectors are positioned to detect movement in a traffic pattern adjacent the walls toward the corner. The warning device includes a speaker adapted to produce an audible warning, a blinking light, and/or lights of different colors.

Disposed within the housing is a control system having a processor connected to a power source, the motion detectors, and the warning device. Upon detection of movement toward the corner the motion detector sends a signal to the control system. The control system processes the signal and sends a directive signal to the warning device(s) in the other end wall from the end wall of the motion detector to activate the warning signal(s).

DETAILED DESCRIPTION

Figure 1:
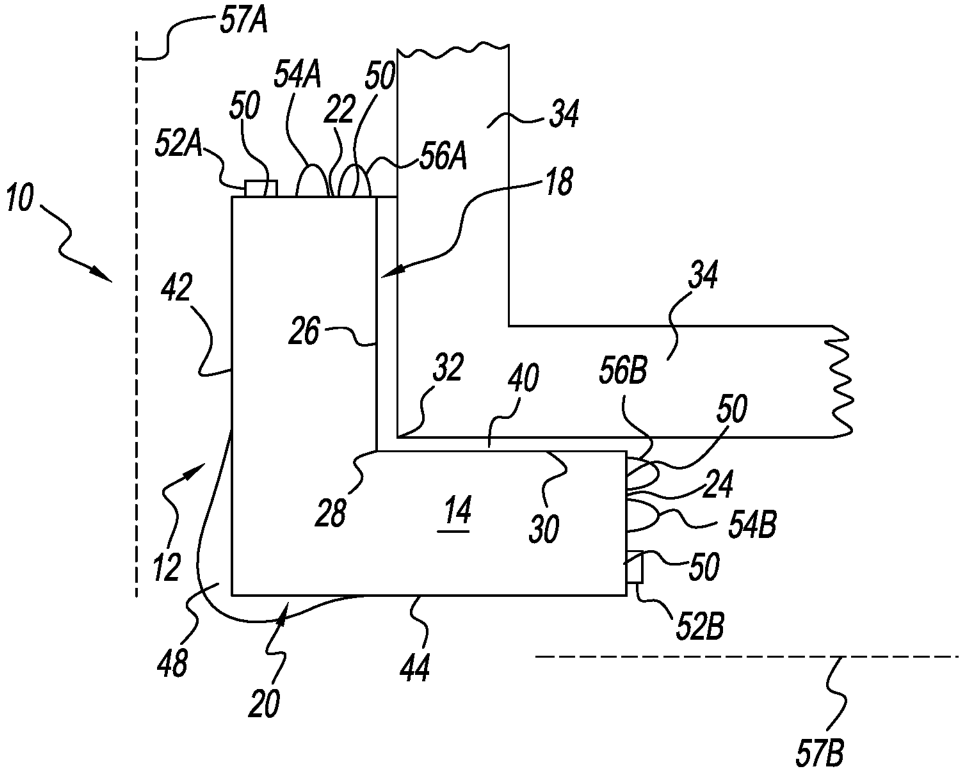
FIG. 1 is a top plan view of a corner warning system.
Figure 2:
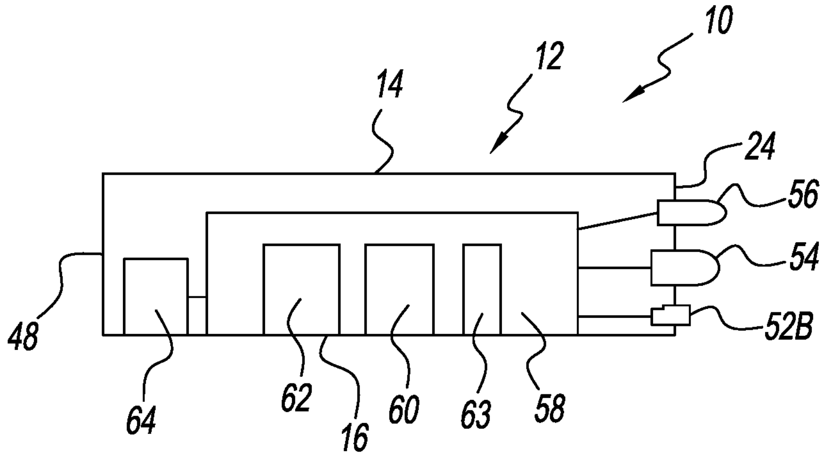
FIG. 2 is a side sectional view of a corner warning system.
Figure 3:
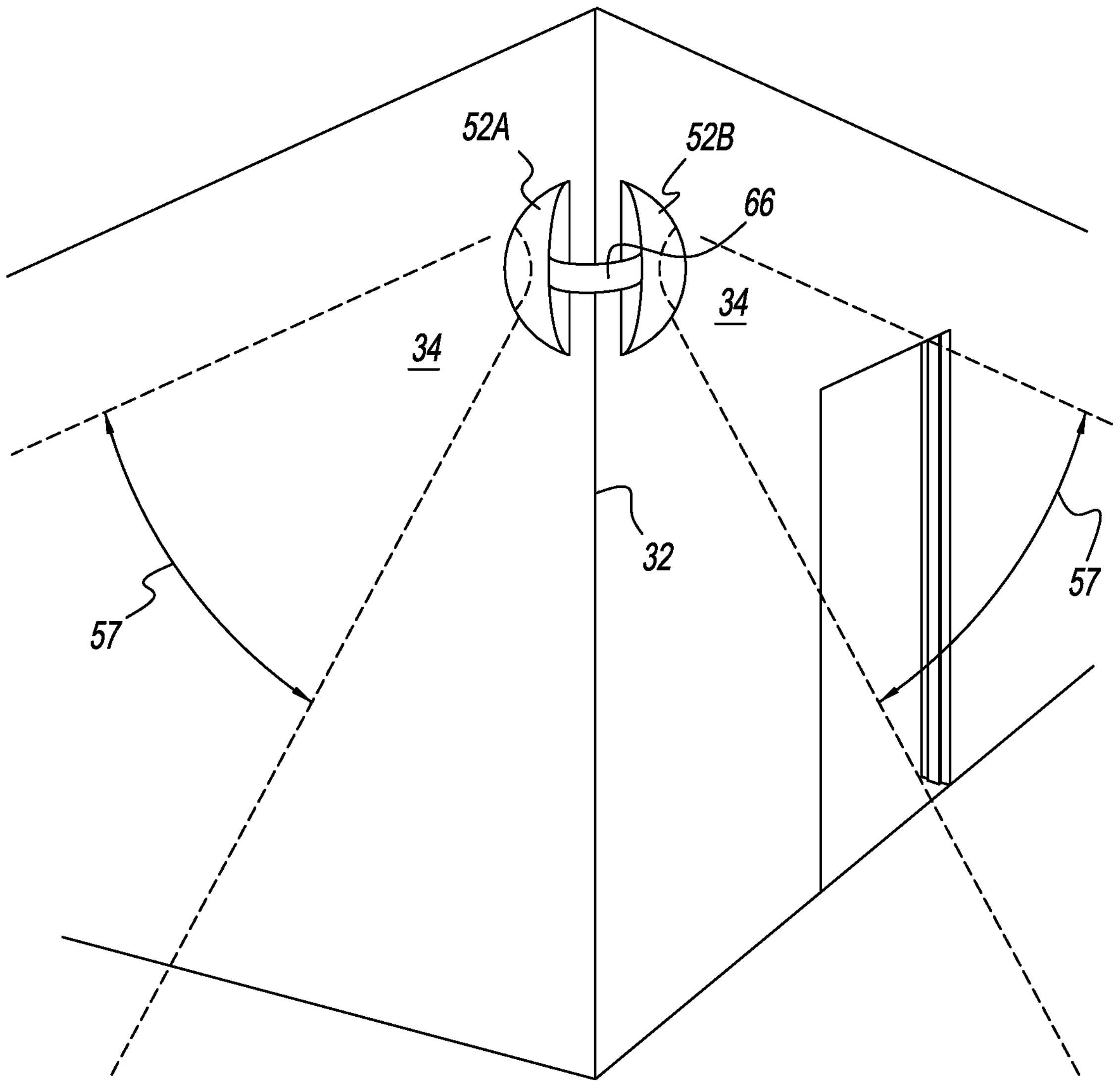
FIG. 3 is a perspective view of a corner warning system.
Figure 4:
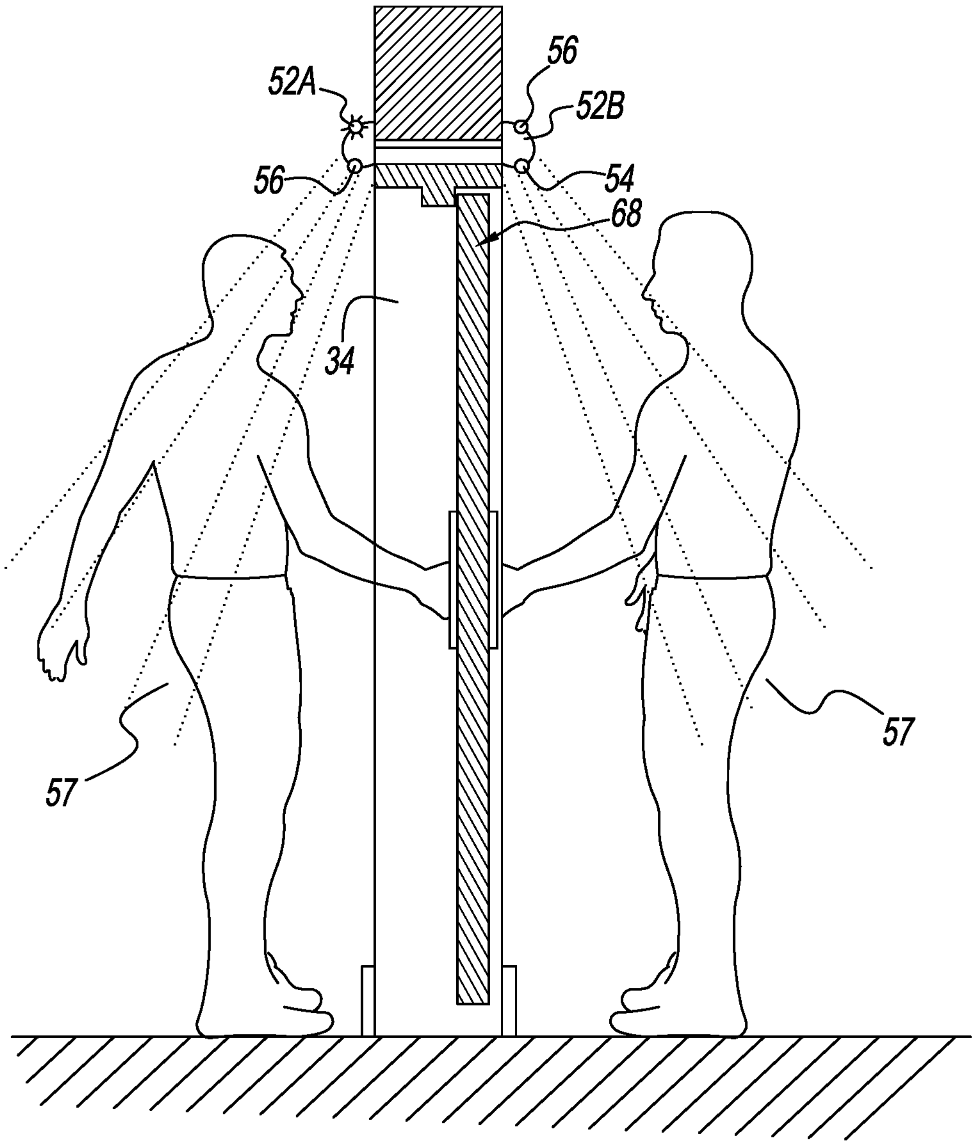
FIG. 4 is a side sectional view of a warning system.
Figure 5:
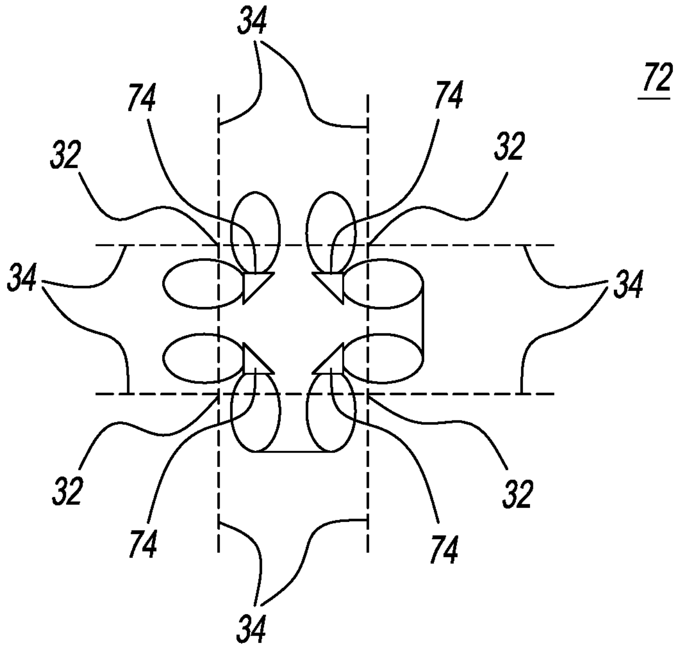
FIG. 5 is a bottom plan view of a warning system.
Figure 6:
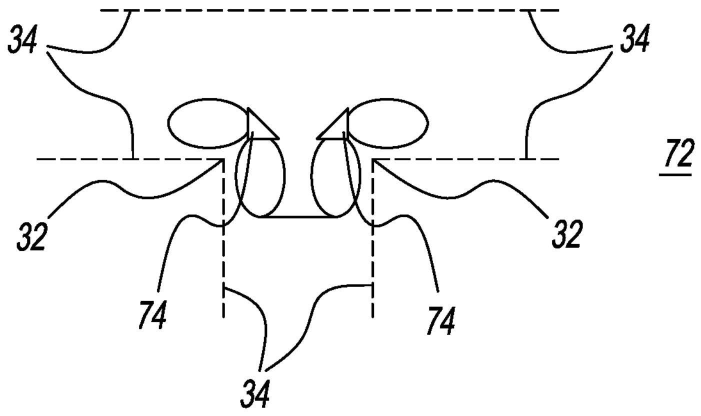
FIG. 6 is a bottom plan view of a warning system.
Figure 7:
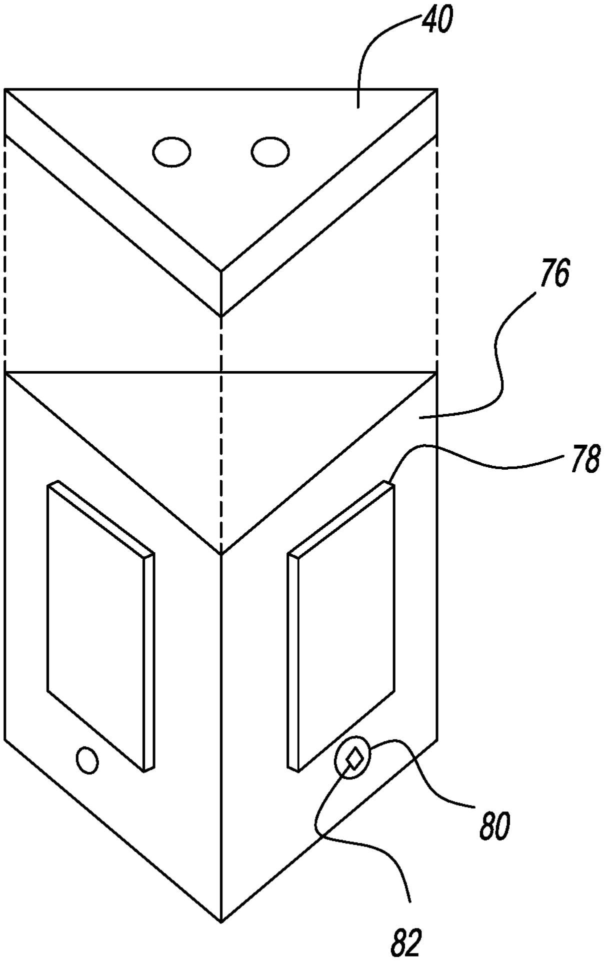
FIG. 7 is a perspective view of a warning system.
Figure 8:
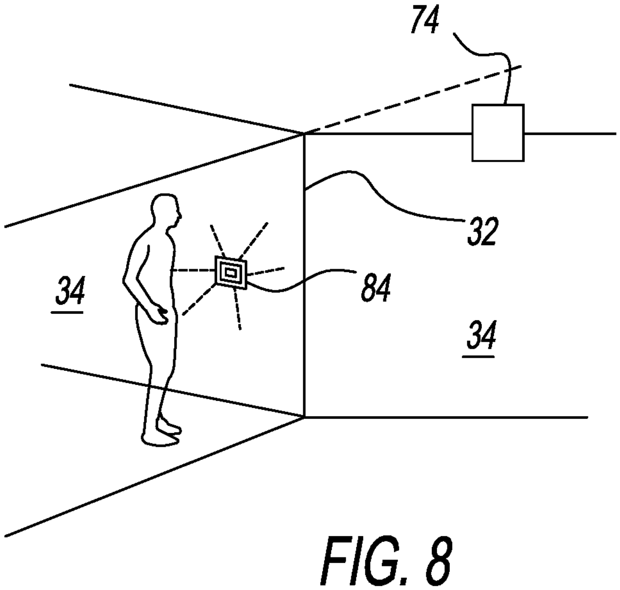
FIG. 8 is a perspective view of a warning system.

Referring to the figures, a corner mount warning system 10 includes a housing 12 having a top wall 14, a bottom wall 16, an inner side wall 18, an outer side wall 20, a first end wall 22, and a second end wall 24. The inner side wall 18 has a first section 26 that extends from the first end wall 22 to an inner corner 28. A second section 30 of the inner side wall 18 extends perpendicularly in relation to the first section 26 from the corner 28 to the second end wall 24.

The inner side wall 18 is formed to receive and engage a corner 32 of two perpendicular walls 34 and is mounted at the floor, the ceiling, or anywhere in between. The inner side wall 18 is mounted directly to the walls 34 with screws, adhesive, or the like. Alternatively, a mounting plate 40 is mounted to the walls 34 and the inner side wall 18 is mounted to the mounting plate 40.

The outer side wall 20 also has a first section 42 and a second section 44 that are generally perpendicular to one another and extend from the first end wall 22 and the second end wall 24 to an outer corner 46. The outer corner 46 can form a sharp point, or preferably is rounded to prevent injuries. Also, a cover 48 can be made of resilient material such as rubber or the like to prevent damage to the housing 12.

The end walls 22 and 24 have at least one, and preferably a plurality of openings 50 in each. Disposed within the housing 12, and aligned with and extending out of the openings 50 in each end wall 22 and 24, are at least one motion detector 52, at least one light 54, and at least one speaker 56.

At least one motion detector 52 is adjustable and adapted to detect motion in a traffic path 57 adjacent the walls 34. Alternatively, more than one motion detector 52 are used and adapted so that their signals cross along the traffic path 57.

Also disposed within the housing 12, is a control system 58 having a processor 60 that operates software 62 and memory 63. The control system 58 is connected to a power source 64 such as a replaceable or rechargeable battery or an external source such as an electric socket.

The motion detectors 52, lights 54, and speakers 56 are all connected to and operated by the control system 58. In operation, the motion detectors 52A and 52B are positioned to detect motion within the traffic paths 57A and 57B respectively. When motion is detected, the motion detector 52A sends a signal to the control system 58. Using the software 62, the processor 60 activates a warning signal only at the end wall opposite the motion detector 52A. The warning signal includes an audio signal through speaker 56, a blinking of one or more of the lights 54, and/or a switch in color of the lights such as from green to red. The intensity of the warning can be intensified, such as a louder audio signal and/or faster flickering of the lights 54 when the system 10 detects motion approaching the corner 32 that is estimated by the control system 58 to arrive at approximately the same time.

In an alternative embodiment a bridge or arc of multiple colored lights 66 extend from a first motion detector 52A to a second 52B. As such, the arc of lights 66 curves around the corner 32 of the walls 34. When no motion is detected in the traffic path 57 the control system sends a signal to a first light 66A (i.e., green), and when motion is detected in the traffic path 57 the control system deactivates the first light 66A and sends a signal to activate the second light 66B (i.e. red).

In yet another embodiment, the system is mounted above a door 68 so that a first motion detector 52A is mounted to the wall 34 on one side of the door 68, and a second motion detector 52B is mounted to the opposite side of the wall 34 and door 68. The motion detectors 52A and 52B are positioned to scan downwardly toward a traffic path 57 and are connected by wiring that extends through the wall 34 or door header. As previously described, the motion detectors 52A and 52B are connected to the control system 58. When both motion detectors 52A and 52B sense motion in the traffic path the control system 58 sends a signal activating an audio and/or video alarm 70.

In still another embodiment, the system 10 is mounted to a ceiling 72 adjacent one or more corners 32. The system has multiple sensing units 74 that preferably are triangular in shape. At least one sensing unit 74 is positioned in spaced relation to the corner 32 at a 45 degree angle, which forms two sides 76 that dwell in 90 degree planes to one another. The sides 76 each have an opening 78 through which tiltable motion detectors 52 extend. Each side 76 also has a laser portal 80 through which a laser 82 emits a design that is projected on a nearby wall 34 (i.e., caution) and activates a remote alarm 84 near the corner 32 on the wall 34. As previously described the motion detectors 52 are connected to a control system 58 and when motion is detected in a traffic path 57 one or more of the lasers 82 are activated as well as the remote alarm 84.

Accordingly, a corner mount warning system has been disclosed that, at the very least, meets all the stated objectives.

What is claimed is:

1. A corner mount warning system with a first wall and a second wall, comprising:

a first motion detector attached to a first wall;

a second motion detector attached to a second wall;

an arc of multiple lights extending about a corner between and connected to the first and second motion detectors; and a control system connected to the first and second motion detectors and the arc of multiple lights and adapted to activate one of the multiple lights based upon motion detected within a traffic path of the first and second motion detectors.

2. A warning system with a ceiling, comprising:

one or more sensing units mounted to a ceiling wherein the sensing units are triangular in shape;

wherein the one or more sensing units is positioned in spaced relation to a corner of two walls at a forty-five degree angle and two sides of the one or more sensing units dwell in ninety degree planes to one another;

the two sides each having an opening through which a motion detector extends and a port through which a laser emits; and a control system connected to the motion detectors and lasers and adapted to activate a remote alarm and the lasers based upon motion detected by the motion detectors.

* * * * *